(12) United States Patent
Xie et al.

(10) Patent No.: US 7,976,665 B2
(45) Date of Patent: *Jul. 12, 2011

(54) METHOD OF MINIMIZING RESIDUE ADHESION FOR THERMO-REVERSIBLE DRY ADHESIVES

(75) Inventors: Tao Xie, Troy, MI (US); Xingcheng Xiao, Madison Heights, MI (US); Ruomiao Wang, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 736 days.

This patent is subject to a terminal disclaimer.

(21) Appl. No.: 11/867,549

(22) Filed: Oct. 4, 2007

(65) Prior Publication Data

US 2009/0090461 A1   Apr. 9, 2009

(51) Int. Cl.
B32B 38/10 (2006.01)
B32B 33/00 (2006.01)
B32B 5/00 (2006.01)

(52) U.S. Cl. ........ 156/247; 156/311; 156/499; 156/230; 428/413; 428/421; 428/457; 428/426; 525/524; 525/407; 528/121

(58) Field of Classification Search .......... 156/311, 156/247, 499, 230; 428/413, 423.1, 421, 428/457, 426; 525/524, 407; 528/121
See application file for complete search history.

(56) References Cited

U.S. PATENT DOCUMENTS

| | | | |
|---|---|---|---|
| 5,755,913 A | 5/1998 | Liaw et al. | |
| 6,759,481 B2 | 7/2004 | Tong | |
| 6,773,535 B1 | 8/2004 | Wetzel | |
| 6,827,325 B2 | 12/2004 | Hofmann et al. | |
| 6,986,855 B1 | 1/2006 | Hood et al. | |
| 7,188,498 B2 | 3/2007 | Browne et al. | |
| 2001/0047579 A1 | 12/2001 | Lee et al. | |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0274455 A1 | 12/2005 | Extrand | |
| 2006/0036045 A1 | 2/2006 | Wilson et al. | |
| 2006/0156535 A1 | 7/2006 | Browne et al. | |
| 2006/0188706 A1* | 8/2006 | Kobayashi et al. | 428/317.1 |
| 2007/0073130 A1 | 3/2007 | Finch et al. | |
| 2007/0289786 A1 | 12/2007 | Cutkosky et al. | |
| 2008/0269420 A1* | 10/2008 | Tong et al. | 525/208 |

OTHER PUBLICATIONS

U.S. Appl. No. 11/867,572, filed Oct. 4, 2007, Xie et al.
Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Xie et al., Self-Peeling Reversible Dry Adhesive System, Chem. Mater., 2008, pp. 2866-2868, vol. 20.
Liu et al., Chemically Cross-Linked Polycyclooctene: Synthesis, Characterization and Shape Memory Behavior, Macromolecules, 2002. pp. 9868-9874, vol. 35.

(Continued)

*Primary Examiner* — Khanh Nguyen
*Assistant Examiner* — Keith T Aziz
(74) *Attorney, Agent, or Firm* — Reising Ethington P.C.

(57) ABSTRACT

One embodiment of the invention includes a method of joining two substrates with multilayer thermo-reversible dry adhesives and separating the two bonded substrates by completely thermally reversing the adhesion via heating.

9 Claims, 2 Drawing Sheets

OTHER PUBLICATIONS

Lendlein et al., Biodegradable, Elastic Shape-Memory Polymers for Potential Biomedical Applications, Science, May 31, 2002, pp. 1673-1676, vol. 296.

Lee et al., Structure and Thermomechanical Properties of Polyurethane Block Copolymers with Shape Memory Effect, Macromolecules, 2001, pp. 6431-6437, vol. 34.

Lin et al., Study on Shape-Memory Behavior of Polyether-Based Polyurethanes. I. Influence of the Hard-Segment Content, J. of Applied Polymer Science, 1998, pp. 1563-1574, V.69.

Lin et al., Study on Shape-Memory Behavior of Polyether-Based Polyurethanes. II. Influence of Soft-Segment Molecular Weight, J. of App. Polymer Science, 1998, pp. 1575-1586, 69.

EPON Resin 828 Structural Reference Manual, Shell Chemicals, Houston, TX.

Gall et al., Shape Memory Polymer Nanocomposites, Acta Materialia, 2002, pp. 5115-5126, vol. 50.

Gall et al., Internal Stress Storage in Shape Memory Polymer Nanocomposites, Applied Physics Letter, Jul. 12, 2004, pp. 290-292, vol. 85, No. 2.

Xu et al., Synthesis and Shape Memory Effects of Si-O-Si Cross-Linked Hybrid Polyurethanes, Polymer, 2006, pp. 457-465, vol. 47.

Crystallisation of Liquid DGEBPA and DGEBPF Epoxy Resins, Resolution Performance Products, Product Bulletin, SC:2365-01, Jul. 2001.

Jeffamine D-230 Polyetheramine, Technical Bulletin, Huntsman Corporation, Copyright 2006.

Xie et al., Self-Peeling Reversible Dry Adhesive System, Materials, & Processes Laboratory, General Motors Research & Development Center, Chem. Mater. 2008,vol. 20, pp. 2866-2.

Aubert et al., Thermally Removable Epoxy Adhesives Incorporating Thermally Reversible Diels-Alder Adducts, The Journal of Adhesion, 2003, vol. 79, pp. 609-616.

International Search Report and Written Opinion, International Application No. PCT/US/2008/060796 Filed Apr. 18 2008, Appicant GM Global Technology Operations, Inc.

Lee et al., A Reversible Wet/Dry Adhesive Inspired by Mussels and Geckos, Nature, Jul. 19, 2007, pp. 338-342, vol. 448.

Lee et al., Single-Molecule Mechanics of Mussel Adhesion, PNAS, Aug. 29, 2005, pp. 12999-13—3, vol. 103, No. 35.

Veriflex Shape Memory Polymer, http://www.crgrp.net/veriflex.shtml, Cornerstone Research Group, Inc., 2003-2007.

Shape Memory Polymer, http://crgnp.net/success-stories.shtml, Cornerstone Research Group, Inc., 2003-2007.

TEMBO Shape Memory Polymers and Elastic Memory Composite (EMC) Material, http://www.ctd-materials.com/products/emc.htm, Cornerstone Research Group, Inc., 2003-2007.

Behl et al., Shape-Memory Polymers: Dual Shape Materials for Bio-medical Applications, A. Mater. Today, 2007, vol. 10, pp. 1-20.

Bellin et al., Polymeric Triple-Shape Materials, PNAS, Nov. 28, 2006, vol. 103, No. 48, pp. 18043-18047.

Chung et al., Two-Way Reversible Shape Memory in a Semicrystalline Network, Macromolecules, 2008, vol. 41, pp. 184-192.

Rousseau et al., Shape Memory Effect Exhibited by Smectic-C Liquid Crystalline Elastomers, J. Am. Chem. Soc., 2003, vol. 125, pp. 15300-15301.

Liu et al., Review of Progress in Shape-Memory Polymers, Journal of Materials Chemistry, 2007, vol. 17, pp. 1543-1558.

Dietsch et al., A Review—Features and Benefits of Shape Memory Polymers (SMPs), Journal of Advanced Materials, Apr. 2007, vol. 39, No. 2, pp. 3-12.

Li et al., Shape Memory Effect of Ethylene-Vinyl Acetate-Copolymers, Journal of Applied Polymer Science, 1999, vol. 71, pp. 1063-1070.

Liu et al., Novel Shape-Memory Polymer with Two Transition Temperatures, Macromol. Rapid Commun., 2005, vol. 26, pp. 649-652.

Reyntjens et al., Polymer Networks Containign Crystallizable Poly(octadecyl vinyl ether) Segments for Shape-Memory Materials, Macromol. Rapid Commun., 1999, vol. 20,pp. 251-255.

Jiang et al., Polymers Move in Response to Light, Advanced Materials., 2006, vol. 18, pp. 1471-1475.

Huang et al., Water-Driven Programmable Polyurethane Shape Memory Polymer: Demonstration and Mechanism, Applied Physical Letters, 2005, vol, 86, pp. 114105-1—3.

Lendlein et al., Light-Induced Shape-Memory Polymers, Nature, Apr. 14, 2005, vol. 434, pp. 879-882.

Goethals et al., Poly(vinyl ethers) as Building Blocks for New Materials, Macromol. Symp. 1998, vol. 132, pp. 57-64.

Xiao, U.S. Appl. No. 12/273,083, Self-Healing and Scratch Resistant Shape Memory Polymer System, filed Nov. 18, 2008.

Xie, U.S. Appl. No. 11/867,531, Reversible Dry Adhesives, filed Oct. 4, 2007.

Xie, U.S. Appl. No. 12/396,045, Polymer Systems with Multiple Shape Memory Effect, filed Mar. 2, 2009.

Xie, U.S. Appl. No. 12/367,826, A Reversible Welding Process for Polymers, filed Feb. 9, 2009.

Xie, U.S. Appl. No. 12/178,844, High Strength Reversible Noncovalent Adhesion Methods for a Solid Polymer-Polymer Interface, filed Jul. 24, 2008.

Cheng, U.S. Appl. No. 12/359,709, Remote Activation of Thermo-Reversible Dry Adhesives, filed Jan. 26, 2009.

Xie, U.S. Appl. No. 12/423,947, Shape Memory Polymer and Adhesive Combination and Methods of Making and Using the Same, filed Apr. 15, 2009.

Xie, U.S. Appl. No. 12/432,211, Shape Memor Polymers with Surface Having Dangling Adhesive Polymeric Chains and Methods of Making and Using the Same, filed Apr. 29, 2009.

Xie, U.S. Appl. No. 12/181,562, Polymer Systems with Multiple Shape Memory Effect, filed Jul. 29, 2008.

Xie, U.S. Appl. No. 11/867,549, Method of Miniimizing Residue Adhesion for Thermo-Reversible Dry Adhesives, filed Oct. 4, 2007.

Xie, U.S. Appl. No. 12/105,865, Attachment Pad with Thermal Reversible Adhesive and Methods of Making and Using the Same, filed Apr. 18, 2008.

Xie, U.S. Appl. No. 11/867,558, Multilayer Adhesive for Thermal Reversible Joining of Substrates, filed Oct. 4, 2007.

Xie, U.S. Appl. No. 12/391,704, Reversible Dry Adhesives for Wet adn Dry Conditions, filed Feb. 24, 2009.

Xie,U.S. Appl. No. 12/105,749, Method for Robotic Handling Using Thermo-Reversible Dry Adhesives, filed Apr. 18, 2008.

Xie, U.S. Appl. No. 12/105,788, Climbing Devices Based on Thermo-Reversible Dry Adhesives, filed Apr. 18, 2008.

Xie, U.S. Appl. No. 11/867,588, Shape Memory Epoxy Polymers, filed Oct. 4, 2007.

\* cited by examiner

METHOD OF MINIMIZING RESIDUE ADHESION FOR THERMO-REVERSIBLE DRY ADHESIVES

TECHNICAL FIELD

The field to which the disclosure generally relates includes thermo-reversible dry adhesives.

BACKGROUND

Gecko feet pads, with nanohair structures on them, are examples of smart dry adhesives. The working principle of the Gecko adhesion is that the nanohair structure allows the foot pad to make maximum contact with a counter surface regardless of its roughness and chemical composition. This is accomplished by nanohairs that are relatively long and protruding from the foot pad at an angle so that adjacent nanohairs can contact the counter surface regardless of its topography. The maximum contact further allows for accumulation of millions of small van der Waals (in the range of microNewtons) interactions between the Gecko foot pad and the counter surface, leading to an overall adhesion force (pull-off force) of about 10 $N/cm^2$. When the detaching force is employed in a peel-off mode, however, the complete detachment is achieved gradually by overcoming small adhesion forces corresponding to very small areas. Thus, the adhesion is easily reversed. Overall, the attractiveness of the Gecko adhesion lies in the combination of adhesive strength (10 $N/cm^2$), reversibility, and the ability to adapt to a variety of surfaces in terms of both the surface roughness and composition. The above unique features of the Gecko adhesion has stimulated scientific research efforts to produce synthetic smart dry adhesives that work using the same principle as the Gecko feet. Up to now, the two best synthetic Gecko adhesives show maximum pull-off strength of 3 and 10 $N/cm^2$ towards glass. Both adhesives suffer from severe adhesion loss after only one or two attaching/detaching cycles, as a result of breakdown of the nano structures or lateral collapse of the nano structures, with the latter referring to the bonding of adjacent nano-hairs. In addition, typical synthetic Gecko adhesives are expensive to produce and large-scale manufacturing is practically too difficult.

SUMMARY OF EXEMPLARY EMBODIMENTS OF THE INVENTION

One embodiment of the invention includes a method of joining two substrates with multilayer thermo-reversible dry adhesives and separating the two bonded substrates by completely thermally reversing the adhesion via heating.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
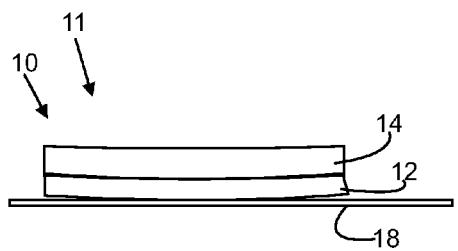
FIG. 1 illustrates a product according to one embodiment of the invention.

Referring to FIG. 1, one embodiment includes a multilayer thermo-reversible dry adhesive 11. In one embodiment, the multilayer thermo-reversible dry adhesive 11 may be a double layer adhesive (DLA) 10. The DLA 10 may include an elastomeric dry adhesive layer 12 and a shape memory polymer (SMP) layer 14.

In various embodiments, the dry adhesive layers may be an epoxy elastomeric dry adhesive. In various embodiments, the shape memory polymer may be an epoxy. In various embodiments, the components of the dry adhesive or the components of the shape memory polymer may include a rigid epoxy and a flexible epoxy. The range of possible crosslinking chemistries which may be used to achieve a dry adhesive or shape memory polymer may include alpha, omega-diaminoalkanes, organic multi-caroxylic acid, anhydride, or catalytic (as in imidazole type) crosslinking reactions. There are many different ways to achieve the appropriate relationships between the molecular properties. For example, the dry adhesives or shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. In one embodiment, the components of the dry adhesive may be present in an amount sufficient to provide, upon curing of the composition, a dry adhesive having a glass transition temperature ($T_g$) of $-90°$ C. to $200°$ C. and having a pull-off strength of $1-200 N/cm^2$ from a substrate. In another embodiment, the dry adhesive may have a glass transition temperature of $-90°$ C. to $25°$ C. In one embodiment, the components of the shape memory polymer composition may be present in an amount sufficient to provide, upon curing of the composition, an epoxy shape memory polymer having a change in storage modulus of 2 to 3 orders of magnitude before and after its glass transition. In one embodiment, the shape memory polymer has a $T_g$ of 25° C. to 200° C.

Figure 2:
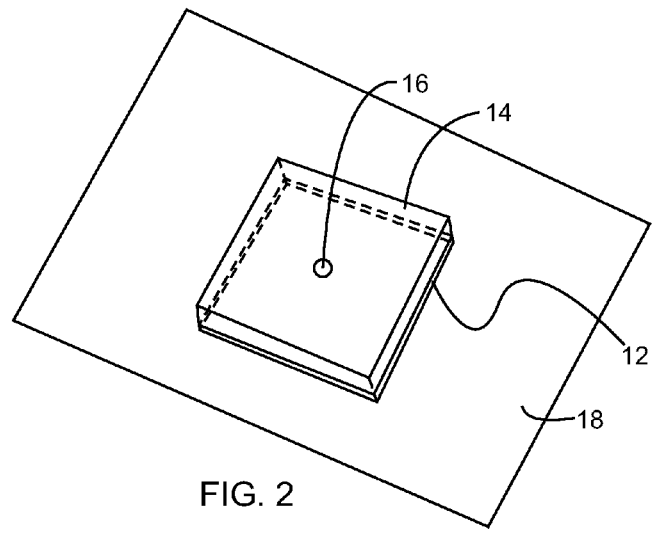
FIG. 2 illustrates a product according to one embodiment of the invention.
Figure 3:
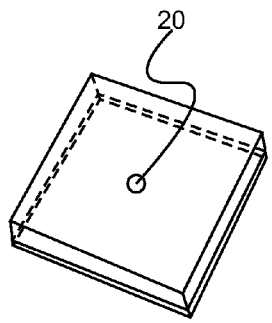
FIG. 3 illustrates a product according to one embodiment of the invention.

FIG. 1 shows the original curvature of the DLA 10 including the dry adhesive layer 12 and the SMP layer 14, according to one embodiment of the invention. In FIG. 1, the DLA 10 is positioned on a flat substrate 18. In various embodiments, the substrate 18 may be, for example but not limited to, stainless steel alloy 304, glass, aluminum alloy 5657, polypropylene, or Teflon (polytetrafluoroethylene). FIG. 2 shows the DLA of FIG. 1 from another angle. As shown in FIG. 2, a contact area 16 between the dry adhesive layer 12 and the substrate 18 is small due to the curvature of the DLA. In one embodiment shown in FIG. 3, the DLA 10 includes a non-adhesive portion 20 formed in the dry adhesive layer 12. In one embodiment, the non-adhesive portion 20 may be formed at approximately the center of the dry adhesive layer 12. In various embodiments, the non-adhesive portion 20 may be introduced by molding or coating methods. The non-adhesive portion 20 may comprise a non-adhesive material, for example but not limited to, glass, metal, or Teflon (polytetrafluoroethylene). In one embodiment, the non-adhesive portion 20 may be an opening in the dry adhesive layer 12. In another embodiment the non-adhesive portion 20 may be a non-adhesive material over the dry adhesive layer 12 or the non-adhesive material may be received in an opening or recess in the dry adhesive layer 12.

Figure 4:
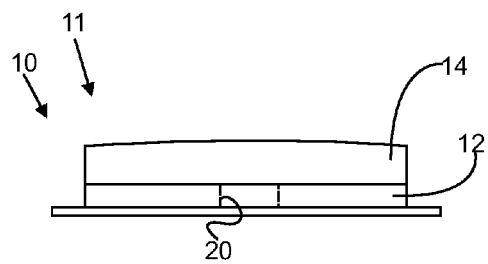
FIG. 4 illustrates a product according to one embodiment of the invention.
Figure 5:
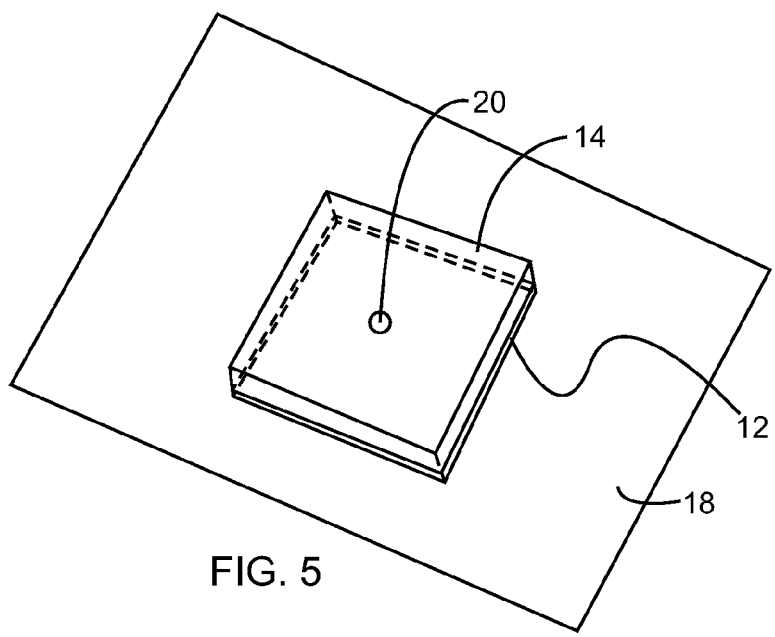
FIG. 5 illustrates a product according to one embodiment of the invention.

In one embodiment, a method is provided for reversible adhesion of the DLA 10. The DLA 10 is positioned on the substrate 18. Then the DLA 10 with the non-adhesive portion 20 is heated to a temperature higher than the glass transition temperature of the SMP layer 14. Then a load is imposed on the DLA 10 while the DLA 10 is cooled. In one embodiment, the load pressure may be about 0.1 N/cm² to about 20 N/cm². In one embodiment, the DLA 10 may be cooled to about 25° C. The DLA 10 deforms and complies with the substrate 18, as shown in FIG. 4 (side view of the DLA) and in FIG. 5 (top view of the DLA). A strong adhesive bond is formed between the DLA 10 and the substrate 18. In one embodiment, adhesive strength of 60 N/cm² may be achieved. As shown in FIG. 5, the DLA 10 may not adhere to the substrate 18 at the location of the non-adhesive portion 20.

According to the method of one embodiment, the DLA 10 is then released from the substrate 18 by heating the DLA 10 to a temperature above the glass transition temperature of the SMP of the SMP layer 14, and not applying a load. The DLA 10 recovers to its original curvature and the residue adhesion is approximately zero, or complete adhesion reversal. FIG. 1 shows a side view of the recovered DLA 10 that has been released from the substrate 18.

Figure 6:
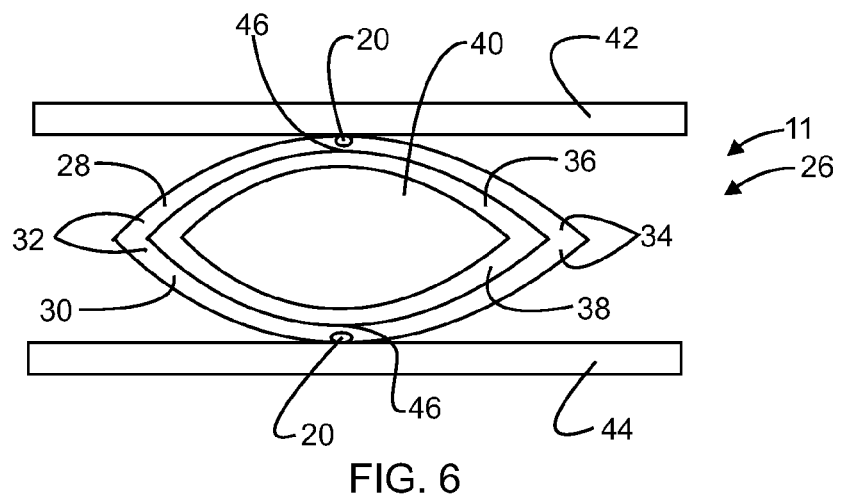
FIG. 6 illustrates a product according to one embodiment of the invention.

Referring to FIG. 6, in another embodiment, the multi-layer thermo-reversible dry adhesive 11 may be a quadruple dry adhesive 26, including two layers or portions of an elastomeric dry adhesive and two layers or portions of a shape memory polymer. The quadruple dry adhesive 26 may include a first dry adhesive layer 28 and a second dry adhesive layer 30, wherein the curvatures of the layers 28, 30 point in the opposite directions. At least one of the first adhesive layer 28 or the second adhesive layer 30 may include the non-adhesive portion 20, as shown in FIG. 6. The outer surface of each of the layers 28, 30 may have a generally convex shape. The first and second dry adhesive layers 28, 30 meet each other at the outer edges 32 and 34. The quadruple dry adhesive 26 may also include a first shape memory polymer portion 36 and a second shape memory polymer portion 38. The first shape memory polymer portion 36 may be positioned adjacent to the first adhesive layer 28. The second shape memory polymer portion 38 may be positioned adjacent to the second adhesive layer 30. A cavity 40 may be formed between the first and second shape memory polymer portions 36, 38.

In one embodiment, the quadruple dry adhesive 26 is positioned between a first substrate 42 and a second substrate 44 and heated to a temperature above the glass transition temperature of the SMP of the first and second shape memory polymer portions 36, 38.

Figure 7:
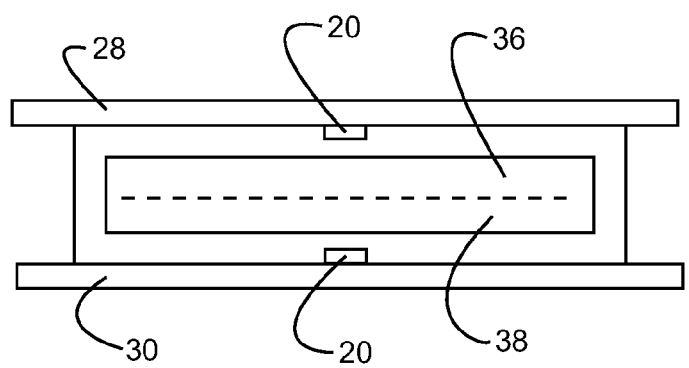
FIG. 7 illustrates a product according to one embodiment of the invention.

Then a load is imposed on the quadruple dry adhesive 26 while is cooled to attach the first substrate 42 to the second substrate 44, as shown in FIG. 7. The quadruple dry adhesive 26 may be cooled to about 25° C. The quadruple dry adhesive 26 deforms and complies with the substrates 42 and 44. Upon cooling under the load, the cavity 40 may become very small or may disappear altogether. A good contact and thus strong adhesive bond is formed between the quadruple dry adhesive 26 and the substrates 42 and 44. The quadruple dry adhesive 26 may not adhere to the first substrate 42 or the second substrate 44 at the non-adhesive portion(s) 20.

Then the quadruple dry adhesive 26 may be released from the first and second substrates 42 and 44 by heating the quadruple dry adhesive 26 to a temperature above the glass transition temperature of the SMP of the first and second shape memory polymer portions 36, 38, and not applying a load. Upon heating, each of the first and second dry adhesive layers 28 and 30 peel from the substrates 42, 44 respectively, first from near the outer edges 32 and 34, and progressing towards a center 46. Upon heating, the cavity 40 forms in between the first and second polymer layers 36 and 38. The quadruple dry adhesive 26 recovers to its original curvature. In an embodiment where the first and second adhesive layers 28, 30 include the non-adhesive portion 20, the residue adhesion is approximately zero, or complete adhesion reversal.

One embodiment of the invention includes a method of making a multilayer thermo-reversible dry adhesive 11 comprising heating 3.6 g of EPON 826 (a Bisphenol A based epoxy resin) to about 75° C. and mixing the same with 2.16 g of neopentyl glycol diglycidyl ether (NGDE) and 2.3 g of a diamine such as Jeffamine D-230. Jeffamine D-230 is a polyetheramine that is difunctional, primary amine with an average molecular weight of about 230. The primary amine groups are located on secondary carbons at the end of the aliphatic polyether chain. Jeffamine is available from Huntsman.

The mixture may then be poured into an aluminum pan and cured in an oven at about 100° C. for 1.5 hours. Then a mixture of 2.16 g of NGDE and 1.15 g of an amine such as Jeffamine D-230 may be poured into the aluminum pan on top of the first cured epoxy layer and cured for 1.5 hours at 100° C. In a third step, the oven temperature may be raised to 130° C. for post-curing for about one hour. At the end of the post-curing, the cured double layer epoxy may be demolded and cut into small pieces, if desired. A double layer epoxy may be obtained with the first layer which had a thickness of about 2 mm and functioned as a shaped memory polymer with a glass transition of about 50° C. and second layer as a dry adhesive having a thickness of about 1 mm. The non-adhesive portion 20 can be formed by selectively depositing a non-adhesive metal coating such as aluminum.

Another embodiment of the invention includes a method of making a dry adhesive layer 12 comprising mixing 4.32 g of neopentyl glycol diglycidyl ether (NGDE) with 2.3 g of an amine such as Jeffamin D-230. The liquid mixture was then poured into an aluminum mold. Curing was conducted in an oven for about 1.5 hours at 100° C. and then for about one hour at 130° C. The cured epoxy may then be demolded and cut into small pieces, if desired.

Another embodiment of the invention includes a method of making an SMP layer 14 comprising mixing 3.6 g of EPON 826 with 2.16 g of NGDE and 2.3 g of Jeffamine D-230. The mixture was poured into a circular aluminum pan and cured at 100° C. for 1.5 hours and postcured at 130° C. for 1 hour. The cured epoxy may then be demolded and cut into small pieces, if desired.

The dry adhesive layer 12 may provide a continuous contact surface or the dry adhesive layer may include a plurality of spaced apart fingers each providing a relative small contact surface so the overall contact surface of the adhesive layer is not continuous.

Numerous shaped memory polymers may be utilized in various embodiments of the invention. For example, staring with a typical aromatic diepoxy/diamine system with a $T_g$ of about 90° C., the aromatic epoxy component is replaced systematically with an aliphatic diepoxy to yield a series of epoxy shape memory polymers with $T_g$'s ranging from 3° C. to 90° C. As such, a shape memory polymer may be tailored for use with a dry adhesive as desired for a particular application operated within certain temperature ranges.

The following is another embodiment of the invention providing a method of making a shape memory polymer layer 14 with $T_g$'s ranging from 3° C. to 90° C. EPON 826 was weighed into a glass bottle and placed into an oven preset at 70° C. to melt. The melting took about 1 hour. Immediately after the bottle containing the EPON 826 was taken out of the oven, weighed Jeffamine D-230 and NGDE were added to the bottle. The bottle was then shaken vigorously by hand for about ten seconds to mix the components. The detailed formulations of the five epoxy SMP samples prepared according to the method are summarized in Table 1.

TABLE 1

Formulations of epoxy samples 1-5

| Sample # | EPON 826 (mole) | NGDE (mole) | Jeffamine D-230 (mole) |
|---|---|---|---|
| 1 | 0 | 0.02 | 0.01 |
| 2 | 0.005 | 0.015 | 0.01 |
| 3 | 0.01 | 0.01 | 0.01 |
| 4 | 0.015 | 0.005 | 0.01 |
| 5 | 0.02 | 0 | 0.01 |

Next, the mixture was poured into an aluminum pan. The epoxy samples were thermally cured at 100° C. for 1.5 hours and postcured at 130° C. for 1 hour. Upon the completion of the cure, the epoxy samples were demolded and cut into desirable shapes.

In another embodiment, a series of epoxy amine shape memory polymers with various crosslink densities were synthesized in the following manner. The epoxy formulations for samples 6-11 are given in Table 2 below. For each sample, 0.02 mole of EPON 826 was weighed into a glass bottle, which was placed into an oven preset at 75° C. and kept there for half an hour. Immediately after the bottle containing EPON 826 was taken out of the oven, Jeffamine D-230 and decylamine were introduced into the bottle according to the amounts specified in Table 2. The bottle was then shaken vigorously by hand for about ten seconds to mix the components and the mixture was poured into an aluminum pan. All epoxy samples were thermally cured at 100° C. for 1.5 hours and postcured at 130° C. for 1 hour. Upon the completion of the cure, the epoxy samples were demolded and cut into desirable shapes.

TABLE 2

Formulations of epoxy samples 6-11

| Sample # | EPON 826 (mole) | Jeffamine D-230 (mole) | decylamine (mole) |
|---|---|---|---|
| 6 | 0.02 | 0.01 | 0 |
| 7 | 0.02 | 0.0075 | 0.005 |
| 8 | 0.02 | 0.005 | 0.01 |
| 9 | 0.02 | 0.0025 | 0.015 |
| 10 | 0.02 | 0.0005 | 0.019 |
| 11 | 0.02 | 0 | 0.02 |

In one embodiment, the system consists of EPON 826, Jeffamine D-230 as the crosslinker, and decylamine as the monoamine. As shown in Table 2, from sample 6 to 11, the fraction of the crosslinker is systematically reduced, while the total amounts of epoxy functionality and active hydrogen functionality on the amines are maintained equal. Among these samples, sample 11 was used as a reference sample because it contains no crosslinker and is not expected to possess shape memory properties.

In one embodiment, the substrate(s) may be flat and the multilayer thermo-reversible dry adhesive 11 may be curved. In another embodiment, the substrate(s) may be curved and the multilayer thermo-reversible dry adhesive 11 may be flat.

The above description of embodiments of the invention is merely exemplary in nature and, thus, variations thereof are not to be regarded as a departure from the spirit and scope of the invention.

What is claimed is:

1. A method comprising:
   providing a multilayer thermo-reversible dry adhesive comprising a first layer comprising a dry adhesive and a second layer comprising a shape memory polymer;
   forming a non-adhesive portion on the first layer;
   providing a substrate;
   positioning the first layer over the substrate with the non-adhesive portion facing the substrate but not adhering to the substrate;
   heating the multilayer thermo-reversible adhesive to a temperature higher than the glass transition temperature of the shape memory polymer;
   imposing a load on the multilayer thermo-reversible dry adhesive while cooling to a temperature below the glass transition temperature of the shape memory polymer, so that a strong adhesive bond is formed between the substrate and a portion of the multilayer thermo-reversible adhesive not including the non-adhesive portion; and
   releasing the multilayer thermo-reversible dry adhesive from the substrate by heating the multilayer thermo-reversible dry adhesive to a temperature above the glass transition temperature of the shape memory polymer, wherein the residue adhesion is approximately zero.

2. A method as set forth in claim 1 further comprising a third layer comprising a dry adhesive, a fourth layer comprising a shape memory polymer, and a second substrate.

3. A method as set forth in claim 2 wherein the third layer comprises a non-adhesive portion.

4. A method as set forth in claim 2 wherein the first layer overlies the second layer and the third layer overlies the fourth layer.

5. A method as set forth in claim 4 further comprising a cavity in between the second layer and the fourth layer before the multilayer thermo-reversible adhesive is not heated with a load imposed.

6. A method as set forth in claim 1 wherein the strong adhesive bond formed between at least one substrate and the multilayer thermo-reversible dry adhesive has a strength of about 60 N/cm$^2$.

7. A method as set forth in claim 2 further comprising: joining the two substrates with multilayer thermo-reversible dry adhesives and separating the two bonded substrates by completely thermally reversing the adhesion via heating.

8. A method as set forth in claim 1 wherein said non-adhesive portion is formed at approximately the center of the first layer.

9. A method as set forth in claim 1 wherein said non-adhesive portion comprises at least one of a opening in the dry adhesive of the first layer, a non-adhesive material received in an opening or recess in the dry adhesive of the first layer, or a non-adhesive material comprising at least one of a glass, metal or polytetrafluoroethylene.

* * * * *